US008496219B2

(12) United States Patent
Okada et al.

(10) Patent No.: US 8,496,219 B2
(45) Date of Patent: Jul. 30, 2013

(54) SEAT SLIDING APPARATUS FOR A VEHICLE

(75) Inventors: Takashi Okada, Kariya (JP); Soichiro Hozumi, Nishio (JP); Koichi Hirota, Takahama (JP); Toshiro Maeda, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 13/390,709

(22) PCT Filed: Aug. 27, 2010

(86) PCT No.: PCT/JP2010/064548
§ 371 (c)(1),
(2), (4) Date: Feb. 16, 2012

(87) PCT Pub. No.: WO2011/027716
PCT Pub. Date: Mar. 10, 2011

(65) Prior Publication Data
US 2012/0145868 A1    Jun. 14, 2012

(30) Foreign Application Priority Data
Sep. 4, 2009   (JP) ................................. 2009-205026

(51) Int. Cl.
*F16M 13/00*    (2006.01)
(52) U.S. Cl.
USPC ........ 248/429; 248/424; 248/430; 297/344.1; 296/65.15; 296/65.13
(58) Field of Classification Search
USPC .. 248/424, 429; 296/65.15, 65.14; 297/344.1, 297/344.11, 344.17, 344.13
See application file for complete search history.

(56) References Cited

U.S. PATENT DOCUMENTS

| | | | | |
|---|---|---|---|---|
| 5,176,353 | A | * | 1/1993 | Aihara et al. ................. 248/430 |
| 5,348,373 | A | * | 9/1994 | Stiennon .................... 297/344.1 |

(Continued)

FOREIGN PATENT DOCUMENTS

| | | |
|---|---|---|
| DE | 101 09 184 A1 | 8/2002 |
| EP | 1974983 A2 | 10/2008 |

(Continued)

OTHER PUBLICATIONS

International Search Report (PCT/ISA/210) issued on Oct. 12, 2010, by Japanese Patent Office as the International Searching Authority for International Application No. PCT/JP2010/064548.

(Continued)

*Primary Examiner* — Terrell McKinnon
*Assistant Examiner* — Daniel J Breslin
(74) *Attorney, Agent, or Firm* — Buchanan Ingersoll & Rooney PC

(57) ABSTRACT

Disclosed is a seat sliding apparatus for a vehicle, the apparatus provided with a pair of lower rails fixed to the vehicle floor and a pair of upper rails fixed to a vehicle seat. The seat sliding apparatus causes screw shafts supported at the upper rail to rotate relative to nut members fixed to the lower rails and the upper rails to move relative to the lower rails in the seat forward-rearward direction. A speed reducer-equipped motor comprises a motor, a gear mechanism, and a gear housing. The gear housing is designed so that the axis of the output shaft of the gear mechanism extends in the seat width direction. A manipulation switch comprises a manipulating portion fixed to the gear housing such that the operation switch is exposed at a forward end of the seat.

4 Claims, 3 Drawing Sheets

U.S. PATENT DOCUMENTS

| | | | |
|---|---|---|---|
| 5,668,357 A | 9/1997 | Takiguchi et al. | |
| 5,765,916 A * | 6/1998 | Patel | 297/344.13 |
| 5,791,622 A * | 8/1998 | Gauger | 248/430 |
| 5,803,491 A * | 9/1998 | Barnes et al. | 280/735 |
| 6,244,660 B1 * | 6/2001 | Yoshimatsu | 297/344.1 |
| 6,429,544 B1 | 8/2002 | Sasaki et al. | |
| 6,578,918 B1 * | 6/2003 | Rinne et al. | 297/320 |
| 6,637,818 B2 * | 10/2003 | Williams | 297/330 |
| 6,773,068 B2 * | 8/2004 | Shinozaki | 297/344.1 |
| 6,857,613 B2 * | 2/2005 | Yokota | 248/429 |
| 7,152,922 B2 | 12/2006 | Garland | |
| 7,303,236 B2 * | 12/2007 | Ritter et al. | 297/344.11 |
| 7,490,905 B2 * | 2/2009 | Ritter et al. | 297/344.11 |
| 7,658,429 B2 * | 2/2010 | Koga et al. | 296/65.15 |
| 7,703,347 B2 * | 4/2010 | Porinsky et al. | 74/441 |
| 7,810,780 B2 * | 10/2010 | Koga et al. | 248/430 |
| 8,007,043 B1 * | 8/2011 | Vuong | 297/250.1 |
| 2004/0164218 A1 | 8/2004 | Yokota | |
| 2006/0226674 A1 * | 10/2006 | Ito et al. | 296/65.13 |
| 2007/0108360 A1 * | 5/2007 | Ito et al. | 248/424 |
| 2008/0078908 A1 | 4/2008 | Koga | |
| 2008/0163708 A1 * | 7/2008 | Porinsky et al. | 74/89.14 |
| 2008/0238126 A1 * | 10/2008 | Koga et al. | 296/65.13 |
| 2008/0238167 A1 * | 10/2008 | Koga et al. | 297/344.1 |
| 2009/0272869 A1 * | 11/2009 | Beneker et al. | 248/429 |
| 2010/0013284 A1 * | 1/2010 | Koga et al. | 297/344.1 |
| 2010/0051776 A1 * | 3/2010 | Koga et al. | 248/429 |
| 2010/0242650 A1 * | 9/2010 | Koga et al. | 74/416 |

FOREIGN PATENT DOCUMENTS

| | | |
|---|---|---|
| GB | 2242355 A | 10/1991 |
| JP | 60-234038 A | 11/1985 |
| JP | 62-20737 A | 1/1987 |
| JP | 63-199139 A | 8/1988 |
| JP | 01-240331 A | 9/1989 |
| JP | 3-146007 A | 6/1991 |
| JP | 5-49465 U | 6/1993 |
| JP | 8-335422 A | 12/1996 |
| JP | 2006-347471 A | 12/2006 |
| JP | 2007-159834 A | 6/2007 |
| JP | 2008-80997 A | 4/2008 |

OTHER PUBLICATIONS

Written Opinion (PCT/ISA/237) issued on Oct. 1, 2010, by Japanese Patent Office as the International Searching Authority for International Application No. PCT/JP2010/064548.

European Search Report dated May 4, 2012 issued by the European Patent Office in the corresponding European Patent Application No. 10813665.6-2424.

International Preliminary Report on Patentability issued Apr. 11, 2012 by The International Bureau of WIPO in International Application No. PCT/JP2010/064548.

Chinese Office Action issued Oct. 10, 2012 by the State Intellectual Property Office of People's Republic of China in corresponding Chinese Application No. 201080038074.4 and English language translation of Office Action.

English translation of Chinese Office Action issued May 27, 2013 by the State Intellectual Property Office of People's Republic of China in Chinese Application No. 201080038074.4 (10 pages).

* cited by examiner

SEAT SLIDING APPARATUS FOR A VEHICLE

FIELD OF THE INVENTION

The present invention relates to a seat sliding apparatus for vehicles, which adjusts the position of a seat in the forward-rearward direction with respect to the floor of a vehicle by actuating a motor in response to manipulation of a manipulation switch.

BACKGROUND OF THE INVENTION

Patent Document 1 discloses a manipulation switch usable in a seat sliding apparatus for vehicles. The manipulation switch is arranged in a side cover, or, in other words, a seat side shield, which is mounted on a side surface of the seating portion of a seat in a vehicle.

PRIOR ART DOCUMENT

Patent Document

Patent Document 1: Japanese Laid-Open Patent Publication No. 8-335422

SUMMARY OF THE INVENTION

Lower rails are fixed to the floor of a vehicle and upper rails, which are movably supported by the lower rails, are fixed to a seat of the vehicle. A seat sliding apparatus for vehicles includes a motor and a speed reducer for reducing the speed of rotation of the motor for improving operating accuracy of the seat sliding apparatus in operation. The motor and the speed reducer are arranged in the vicinity of the upper rails. As a result, the motor is spaced from the manipulation switch and thus needs a long wire harness for electrically connecting the motor to the manipulation switch. The long wire harness needs a large space for arranging and also has a great mass.

Accordingly, it is an objective of the present invention to provide a seat sliding apparatus for vehicles that saves space for arranging a wire harness for electrically connecting a motor to a manipulation switch and avoids use of a wire harness with a great mass.

To achieve the foregoing objective and in accordance with one aspect of the present invention, a seat sliding apparatus for a vehicle is provided that includes a first pair of rails fixed to either one of a floor of a vehicle and a seat in the vehicle, a rail structure, a pair of nut members, a pair of screw shafts, a speed reducer, and a manipulation switch. The rail structure includes a second pair of rails fixed to the other one of the floor and the seat. The second rails are connected to the first rails in a manner movable relative to the first rails in a seat forward-rearward direction. Each of the nut members is fixed to one of the first rails, respectively. Each screw shaft is rotationally supported by the one of the second rails and threaded to one of the nut members, respectively. The screw shafts rotate relative to the corresponding nut members to move the second rails relative to the first rails in the seat forward-rearward direction. The speed reducer is equipped motor connected to the two screw shafts through a transmission mechanism to rotate the screw shafts. The speed reducer-equipped motor includes a motor, a gear mechanism, which is connected to a rotary shaft of the motor to reduce the speed of rotation of the motor, and a gear housing that rotationally supports the gear mechanism and is fixed to the rail structure such that the axis of an output shaft of the gear mechanism extends in a seat width direction. The manipulation switch actuates the speed reducer-equipped motor. The manipulation switch has a manipulating portion fixed to the gear housing and exposed at a forward end of the seat.

In this configuration, the manipulation switch is electrically connected to the motor in the immediate proximity of the motor. This decreases the length of a wire harness necessary for connecting the manipulation switch to the motor. Correspondingly, the size of the space needed for arranging the wire harness and the mass of the wire harness are prevented from being increased. Also, since the manipulating portion of the manipulation switch is exposed at a forward end of the seat, the manipulating portion may be reached and manipulated from in front of the seat. The sensation of manipulating the manipulating portion is thus similar to that of a manual seat sliding apparatus for vehicles, which adjusts the position of a seat in the forward-rearward direction in the vehicle through manual operation of a manipulation handle. Manipulation of the manipulating portion is thus facilitated.

The rail structure preferably includes a reinforcement bracket that is fixed to front end portions of the two second rails to connect the second rails together in the seat width direction, and the gear housing is preferably fixed to the reinforcement bracket.

In this configuration, since the front end portions of the two second rails are fixed to and integrated with the reinforcement bracket, rigidity as a whole is improved. The reinforcement bracket thus stably supports the gear housing, which supports a relatively great load, or, in other words, the gear mechanism. Since the manipulation switch is fixed to the gear housing, which is supported by the reinforcement bracket in this manner, the manipulation switch is allowed to stably receive manipulation load produced by the user.

Preferably, the above described seat sliding apparatus further includes a rotation sensor for detecting rotation of the motor, a control circuit that controls rotation of the motor based on the detected rotation, and a circuit case for accommodating the rotation sensor and the control circuit. The circuit case is fixed to the gear housing.

In this configuration, since the circuit case is fixed to the gear housing, the motor and the control circuit are electrically connected to each other in the immediate proximity of the motor. This decreases the length of a wire harness needed for connecting the motor and the control circuit. Correspondingly, the size of the space needed for arranging the wire harness and the mass of the wire harness are prevented from being increased more effectively.

The manipulation switch is preferably fixed to the gear housing through the circuit case and electrically connected to the motor through the control circuit.

In this configuration, the manipulation switch is fixed to the gear housing through the circuit case. As a result, the manipulation switch is connected directly to the control circuit (a control circuit substrate), for example, and thus electrically connected to the motor. This simplifies the configuration for electrical connection between the manipulation switch and the control circuit and decreases the number of the manufacturing steps.

The transmission mechanism preferably includes a transmission shaft, first pair of gears, second gears, and a pair of casings. The transmission shaft extends along the axis of the output shaft of the gear mechanism and is passed through the gear housing. The transmission shaft is connected to an output gear of the gear mechanism and is rotatable integrally with the output gear. The first pair of gears are connected to opposite end portions of the transmission shaft in a manner rotatable integrally with the transmission shaft. The second gears are connected to front end portions of the corresponding screw shafts and rotatable integrally with the screw shafts. Each of the second gears is meshed with the corresponding one of the first gears to change the orientation of the rotation axis of rotation of the first gear and to transmit the rotation of the first gear to the corresponding screw shaft. The casings are fixed to opposite end portions of the rail structure in the seat width direction. Each of the casings rotationally supports the corresponding one of the first gears and the associated one of the second gears.

In this configuration, the transmission mechanism for transmitting rotation of the speed reducer-equipped motor to the two screw shafts is configured by the transmission shaft, the two first gears and the corresponding second gears, and the casings. In this case, by reducing the speed of rotation of the motor sufficiently through the gear mechanism, transmission of rotation involving a direction change between the first and second gears is performed without substantially changing the speed through a simple configuration. This further reduces the size of each casing and thus the size of the rail cross section of each second rail. Further, since load acting between the first and second gears is decreased, the rigidity of each of the first and second gears may be further reduced. This improves flexibility in selection of the material for forming each gear. Additionally, the gear housing for supporting the gear mechanism and each casing for supporting the first and second gears are fixed to and integrated with the rail structure, rotation of the gear mechanism is transmitted to the two first gears and the corresponding second gears through the transmission shaft in a more stabilized state.

The motor is preferably arranged such that the axis of the rotary shaft of the motor extends substantially in the forward-rearward direction, which is different from the seat width direction in which the axis of the transmission shaft extends.

In this configuration, the motor is arranged such that the axis of the rotary shaft of the motor extends substantially in a vehicle forward-rearward direction. As a result, by arranging the motor (the speed reducer-equipped motor) along the extending direction of each second rail, for example, the motor (the speed reducer-equipped motor) may be arranged in the space formed between the two second rails.

DETAILED DESCRIPTION OF THE PREFERRED EMBODIMENTS

An embodiment of the present invention will now be described with reference to the attached drawings.

Figure 1:
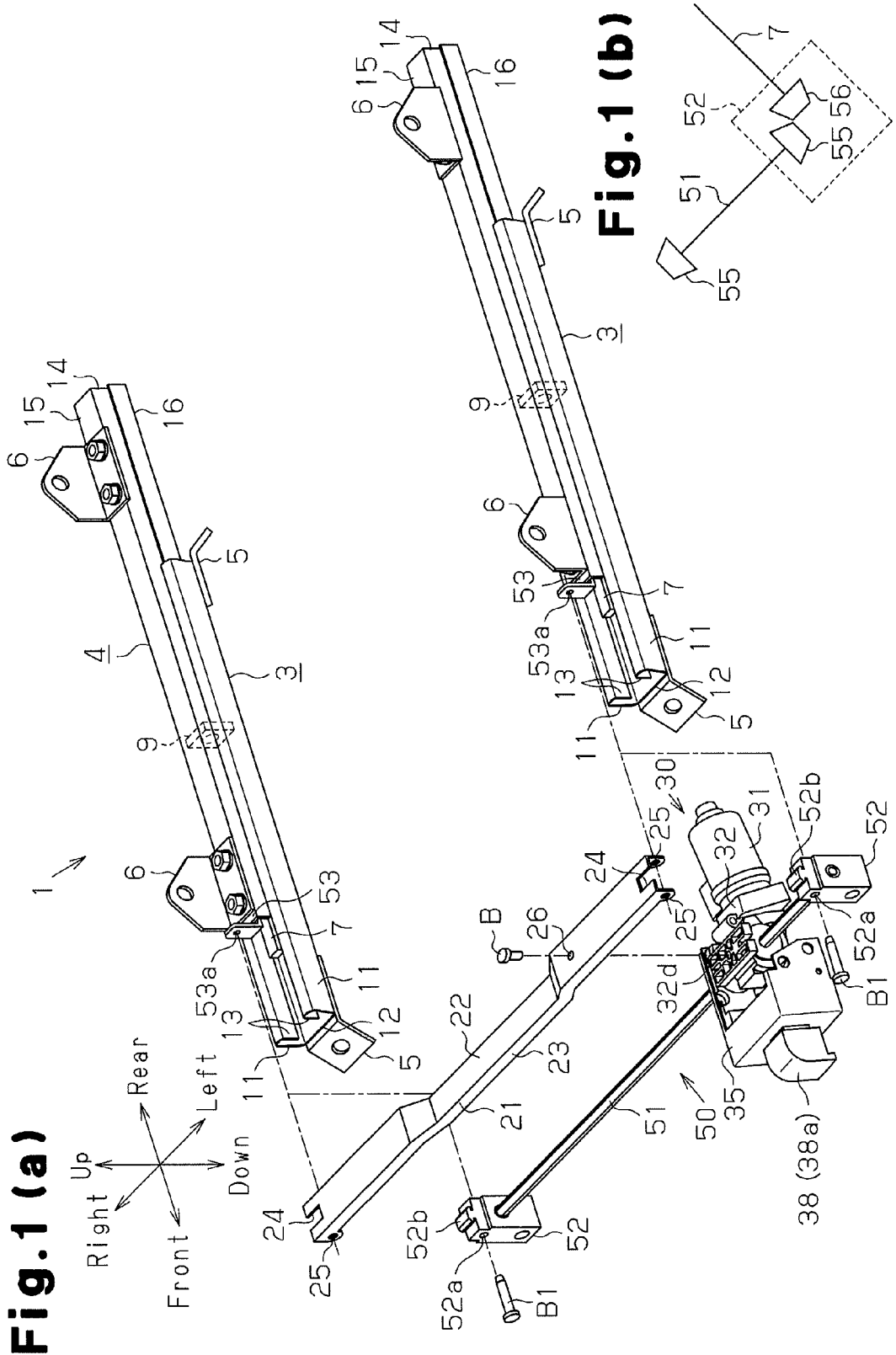
FIG. 1(a) is an exploded perspective view showing a seat sliding apparatus according to an embodiment of the present invention.
FIG. 1(b) is a schematic view showing a first gear and a second gear in a casing for the seat sliding apparatus illustrated in FIG. 1(a)

FIG. 1(a) is an exploded perspective view showing a seat sliding apparatus 1 for a vehicle according to the illustrated embodiment. The seat sliding apparatus 1 is used in a seat (not shown) mounted in a vehicle such as an automobile. In the illustrated embodiment, the width direction (the leftward-rightward direction) and the forward-rearward direction of the seat correspond to the width direction and the forward-rearward direction of the vehicle, respectively.

As shown in FIG. 1(a), a pair of lower rails 3 serving as first rails are arranged on opposite sides in the seat width direction. The lower rails 3 are fixed to the floor of the vehicle and extend in the seat forward-rearward direction. A pair of upper rails 4 serving as second rails are arranged on opposite sides in the seat width direction. Each one of the upper rails 4 is mounted on the corresponding one of the lower rails 3 and is movable relative to the lower rail 3 in the seat forward-rearward direction.

Each of the lower rails 3 has a pair of side wall portions 11, a bottom wall portion 12, and a pair of folded wall portions 13, which are formed as an integral body in a manner continuous from one another. The side wall portions 11 extend upward from opposite sides of the bottom wall portion 12 in the width direction. The bottom wall portion 12 joins the basal ends (the lower ends) of the side wall portions 11 to each other. Each of the folded wall portions 13 extends inward from the distal end (the upper end) of the corresponding one of the side wall portions 11 in the width direction and is then folded toward the bottom wall portion 12. The lower rails 3 are fixed to the floor of the vehicle through a pair of leg brackets 5, which are fixedly attached to a front end portion and a rear end portion of the bottom wall portion 12.

Each of the upper rails 4 has a pair of side wall portions 14, a top wall portion 15, and a pair of folded wall portions 16, which are formed as an integral body in a manner continuous from one another. The side wall portions 14 extend in the upward-downward direction at corresponding positions between the two folded wall portions 13 of the corresponding lower rail 3. The top wall portion 15 joins the basal ends (the upper ends) of the side wall portions 14 to each other. Each of the folded wall portions 16 extends outward from the distal end (the lower end) of the corresponding one of the side wall portions 14 in the width direction and is then folded in such a manner as to be surrounded by the wall portions 11 and the folded wall portions 13 of the corresponding lower rail 3.

The lower rails 3 and the upper rails 4 each have a substantially U-shaped cross section. Each lower rail 3 and the corresponding upper rail 4 are arranged such that the opening of the lower rail 3 and the opening of the upper rail 4 face each other. Each lower rail 3 and the corresponding upper rail 4 are prevented from separating from each other in the upward-downward direction through engagement between the folded wall portions 13 and the folded wall portions 16. The rail cross section formed through engagement between the lower rail 3 and the upper rail 4 has a rectangular shape. Each lower rail 3 cooperates with the corresponding upper rail 4 to form an inner space.

Each upper rail 4 is supported by a rolling element (not shown) arranged between the upper rail 4 and the corresponding lower rail 3 in a manner slidable with respect to the lower rail 3 in the longitudinal direction (the seat forward-rearward direction). Pairs of seat brackets 6 are attached to opposite ends of the top wall portion 15 of each upper rail 4 in the forward-rearward direction. Each upper rail 4 is fixed to a seat, which forms a seating portion for an occupant, through the two seat brackets 6. As a result, the position of the seat in the forward-rearward direction is adjusted with respect to the floor of the vehicle through movement of the upper rail 4 relative to the lower rail 3.

Each upper rail 4 supports a round rod-like screw shaft 7, which is received in the inner space formed by the upper rail 4 and the corresponding lower rail 3. The screw shaft 7 extends in the seat forward-rearward direction, which is the sliding direction of the upper rail 4. The screw shaft 7 is supported rotationally with respect to the upper rail 4 but immovably in the axial direction. The supporting mode of the screw shaft 7 with respect to the upper rail 4 is not illustrated.

Each of the screw shafts 7 has a threaded portion (an external thread) formed on an outer peripheral portion of the screw shaft 7 in accordance with a predetermined axial range. With reference to FIG. 1(a), a nut member 9 having a threaded portion (an internal thread), which is engaged with the threaded portion of the corresponding screw shaft 7, is fixed to each lower rail 3. As a result, as each screw shaft 7 rotates with respect to the corresponding nut member 9, the screw shaft 7 moves integrally with the corresponding upper rail 4 relatively to the nut member 9 (the lower rail 3) in the forward-rearward direction. As has been described, this adjusts the position of the seat in the forward-rearward direction with respect to the floor of the vehicle. When the screw shaft 7 stops to rotate, the screw shaft 7 is restricted from moving integrally with the upper rail 4 relative to the nut member 9 (the lower rails 3) in the forward-rearward direction. This restricts movement of the seat relative to the floor of the vehicle in the forward-rearward direction. The seat of the vehicle is thus maintained at a certain position in the forward-rearward direction.

A reinforcement bracket 21 formed by a metal plate, which connects the upper rails 4 to each other in the seat width direction, is fixed to upper front end portions of the upper rails 4. The reinforcement bracket 21, together with the upper rails 4, configures a rail structure. The reinforcement bracket 21 has a body wall portion 22 and a pair of flanges 23, which are formed integrally with one another. The body wall portion 22 extends in the seat width direction. The flanges 23 extend downward from the front end and the rear end of the body wall portion 22. The reinforcement bracket 21 is formed in such a shape that opposite end portions are raised with respect to a central portion in the seat width direction, or, in other words, has a moderate U shape as viewed in the forward-rearward direction.

The reinforcement bracket 21 has U-shaped cutouts 24, each of which has an opening faced outward, at the opposite ends of the body wall portion 22 in the seat width direction. Pairs of bolt passing holes 25 are formed in distal end portions of the two flanges 23, which are located below each of the cutouts 24. Each pair of the bolt passing holes 25 are aligned on a line in the seat forward-rearward direction. The reinforcement bracket 21 also has a bolt passing hole 26, which is an opening facing both upward and downward, at a position to the left in the body wall portion 22.

A speed reducer-equipped motor 30 is fixed to the reinforcement bracket 21. The speed reducer-equipped motor 30 includes a motor 31, a gear mechanism, and a gear housing 32. The gear mechanism is connected to the rotary shaft of the motor 31 and reduces rotation speed of the motor 31. The gear housing 32 rotationally supports the gear mechanism. The gear mechanism may be, for example, a worm gear, which is configured by a worm serving as an input gear fixedly attached to the rotary shaft of the motor 31 and a worm wheel serving as an output gear engaged with the worm. The speed reducer-equipped motor 30 is fixed to the reinforcement bracket 21 in the gear housing 32.

Figure 2:
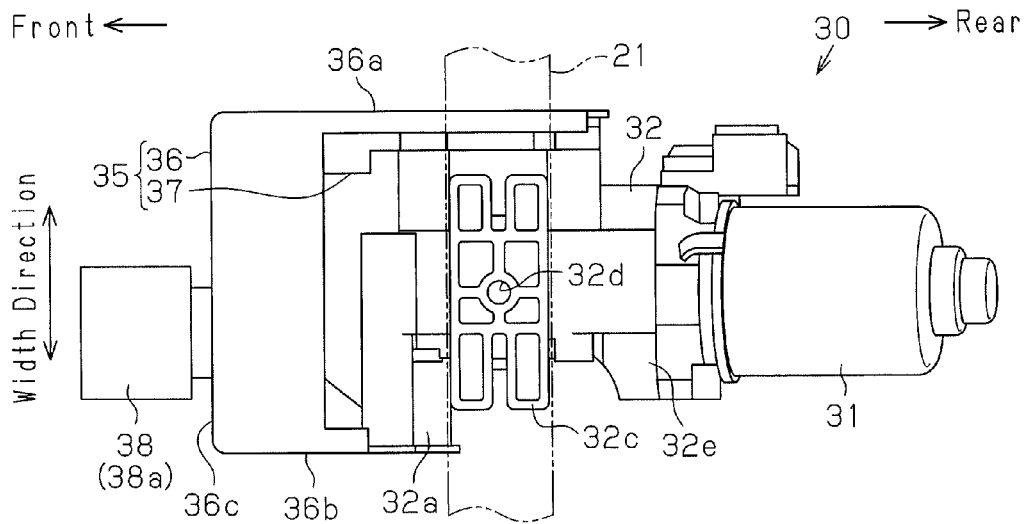
FIG. 2 is a plan view showing a speed reducer-equipped motor for the seat sliding apparatus illustrated in FIG. 1(a)
Figure 3:
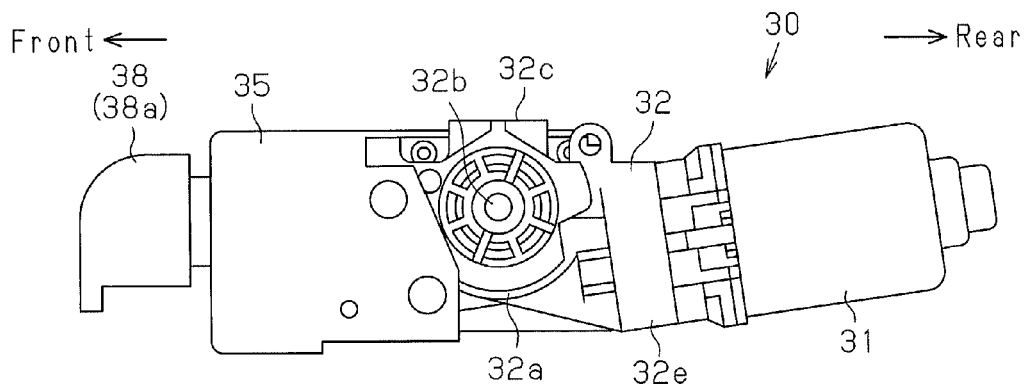
FIG. 3 is a side view showing the speed reducer-equipped motor shown in FIG. 2.

Specifically, as illustrated in FIGS. 2 and 3, the gear housing 32 has a housing portion 32a, which accommodates and supports the gear mechanism such that the axis of the worm wheel (the output shaft) extends in the seat width direction. The gear housing 32 has a shaft passing hole 32b, which extends through the housing portion 32a along the axis of the worm wheel. The gear housing 32 is made of, for example, resin material. The gear housing 32 also includes a block-shaped attachment portion 32c, which projects upward from the housing portion 32a. The width of the attachment portion 32c is slightly smaller than the distance between the two flanges 23 of the reinforcement bracket 21. An upper surface of the attachment portion 32c has a threaded hole 32d, which extends downward from the upper surface. The upper surface of the attachment portion 32c is received between the flanges 23 of the reinforcement bracket 21 and contacts the body wall portion 22. In this state, by passing a bolt B (see FIG. 1(a)) through the bolt passing hole 26 and threading the threaded portion of the bolt B onto the threaded hole 32d, the gear housing 32 is fixed to the reinforcement bracket 21.

The gear housing 32 has a tubular holder portion 32e, which extends rearward from the housing portion 32a. The motor 31 is engaged with the holder portion 32e with the rotary shaft of the motor 31 received in the holder portion 32e. The motor 31 is thus fixed to the gear housing 32. The axis of the rotary shaft of the motor 31, which extends substantially in the seat forward-rearward direction, or, in other words, the axis of the worm, does not coincide with the axis of the worm wheel (the output shaft).

Figure 4:
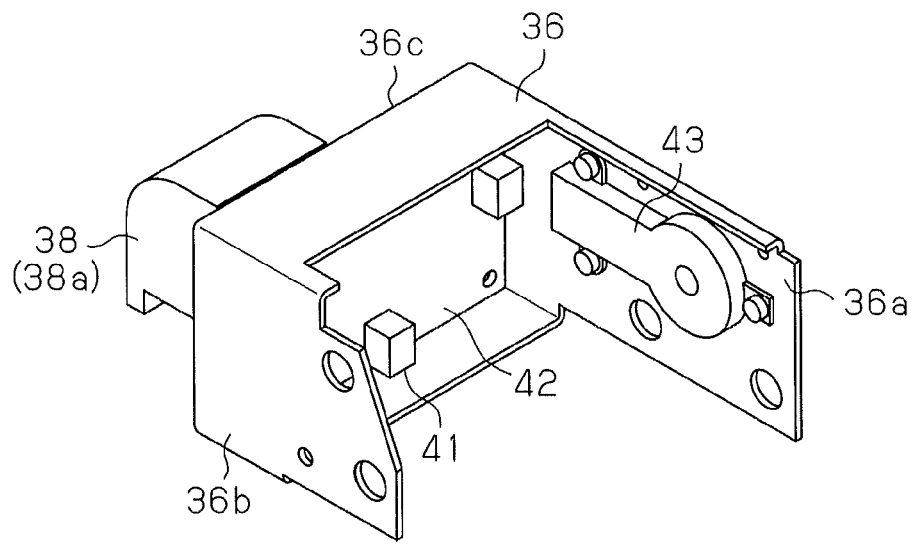
FIG. 4 is a perspective view showing an outer case of a circuit case for the seat sliding apparatus shown in FIG. 1(a)
Figure 5:
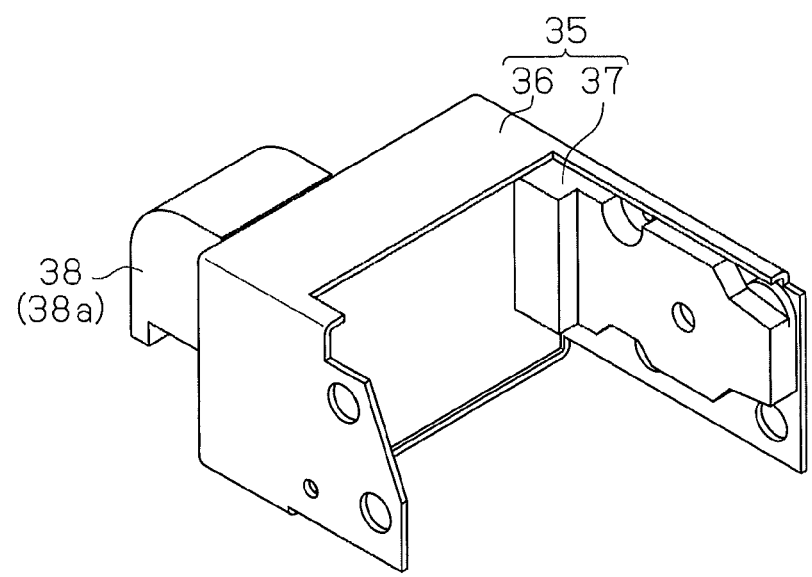
FIG. 5 is a perspective view showing the circuit case illustrated in FIG. 4.

A circuit case 35 is fixed to the gear housing 32 and projects forward from the gear housing 32. As illustrated in FIGS. 4 and 5, the circuit case 35 includes an outer case 36 and an inner case 37, which are formed of resin or metal. The outer case 36 includes a pair of side wall portions 36a, 36b and an attachment wall 36c. The side wall portions 36a, 36b are spaced from each other in the seat width direction and face each other. The attachment wall 36c extends in the seat width direction to connect the front ends of the side wall portions 36a, 36b. The side wall portions 36a, 36b extend parallel to each other in the seat forward-rearward direction. The circuit case 35 is formed in a channel-like shape having an opening facing rearward. The opening width of the outer case 36 (the distance between the side wall portions 36a, 36b) is greater than the dimension of the gear housing 32 in the seat width direction. The circuit case 35 is fastened to the gear housing 32 through the side wall portions 36a, 36b.

A control circuit substrate 42 having a control circuit 41 is held by the inner wall surface of the attachment wall 36c. The control circuit substrate 42 is electrically connected to a battery (not shown) mounted in the vehicle through a wire harness. The control circuit substrate 42 is electrically connected also to the motor 31 through another wire harness. The connection mode between the control circuit substrate 42 and the battery in the vehicle and the connection mode between the control circuit substrate 42 and the motor 31 are not illustrated herein. A rotary switch 43, which serves as a rotation sensor for detecting rotation of the motor 31, is held by the inner wall surface of the side wall portion 36a. The rotary switch 43 is wire-connected to the control circuit substrate 42 and electrically connected to the control circuit 41. The control circuit 41 controls rotation of the motor 31 based on the rotation of the motor 31 detected by the rotary switch 43.

The inner case 37 is held by the inner surfaces of the outer case 36 in such a manner as to cover the control circuit substrate 42 and the rotary switch 43 at the corresponding positions between the inner case 37 and the outer case 36. In this manner, the control circuit substrate 42 and the rotary switch 43 are received in the circuit case 35 without being exposed to the exterior.

A manipulation switch 38, which is manipulated to actuate the motor 31, is fixed to a front end portion (the attachment wall 36c) of the outer case 36. The manipulation switch 38 outputs a manipulation signal for moving the seat forward or rearward in the vehicle to the control circuit 41. The connection terminal of the manipulation switch 38 is passed through the attachment wall 36c and connected directly to the control circuit 41 (the control circuit substrate 42). The manipulation switch 38 has a manipulating portion 38a, which is exposed at a forward end of the seat in the vehicle so that the occupant seated on the seat can reach and manipulate the manipulation switch 38 from in front of the seat.

A hexagonal rod-like transmission shaft 51 is passed through a shaft passing hole 32b, which is formed in the gear housing 32, immovably in the axial direction. The transmission shaft 51 is engaged with the worm wheel in a manner rotatable integrally with the worm wheel. The transmission shaft 51 extends along the axis of the worm wheel (the output shaft), or, in other words, in the seat width direction. An upper portion of the transmission shaft 51 is covered by the reinforcement bracket 21. A box-like casing 52 is fixed to the front end of each of the upper rails 4. The casings 52 are arranged between the flanges 23 at the opposite ends of the reinforcement bracket 21. Specifically, a fixing bracket 53 is fastened to the front end of each upper rail 4. A through hole 53a, which is an opening that faces both forward and rearward in the seat at a position above the top wall portion 15, is formed in the fixing bracket 53. Each of the casings 52 has a pair of bolt passing holes 52a, each of which is an opening that is coaxial with the through hole 53a and the corresponding bolt passing holes 25 and faces both forward and rearward in the seat. A T-shaped engagement claw portion 52b, which projects upward from the upper end of each casing 52 and is engaged with the peripheral portion of the corresponding cutout 24, is formed in an upper portion of the casing 52. Specifically, the engagement claw portions 52b are engaged with the peripheral portions of the corresponding cutouts 24 and nuts are fastened to threaded portions of bolts B1, each of which is passed through the corresponding bolt passing holes 25, bolt passing hole 52a, and through hole 53a. This fixes each casing 52 to the corresponding upper rail 4 and the reinforcement bracket 21 at a position between the flanges 23 of the reinforcement bracket 21.

With reference to FIG. 1(b), the opposite end portions of the transmission shaft 51 are received in the corresponding casings 52. Each end portion of the transmission shaft 51 is engaged with a first gear 55, which is accommodated in the corresponding casing 52, in a manner rotatable integrally with the first gear 55. The front end portion of each screw shaft 7 projects forward from the associated upper rail 4 and is received in the corresponding casing 52. The front end portion of the screw shaft 7 is engaged with a second gear 56, which is received in the casing 52, in a manner rotatable integrally with the second gear 56. Each first gear 55 and the corresponding second gear 56 are rotationally supported by the associated casing 52, with the axis of the first gear 55 and the axis of the second gear 56 extending perpendicular to each other. The first gear 55 and the second gear 56 configure screw gears that are meshed with each other in the casing 52, thus changing the orientation of the axis of rotation of the first gear 55, which rotates integrally with the transmission shaft 51, without changing the speed of such rotation. The rotation of the first gear 55 is thus transmitted to the second gear 56 and the corresponding screw shaft 7. The transmission shaft 51, the two first gears 55 and the corresponding second gears 56, and the casings 52 configure a transmission mechanism 50.

An overall description of operation of the illustrated embodiment will be given below.

When the occupant seated on the seat in the vehicle manipulates the manipulating portion 38a, a manipulation signal for moving the seat forward or rearward in the vehicle is output to the control circuit 41. This causes the control circuit 41 to start actuating the motor 31 in the rotating direction corresponding to the manipulation signal and controls rotation of the motor 31 in correspondence with the rotation of the motor 31 detected by the rotary switch 43. As the motor 31 rotates, the transmission shaft 51 rotates integrally with the worm wheel received in the gear housing 32. This causes each pair of the screw gears, which are connected to the corresponding end portion of the transmission shaft 51, to change the orientation of the axis of rotation of the transmission shaft 51. The screw shafts 7, which are supported by the associated upper rails 4, are thus rotated relative to the nut members 9 simultaneously with the transmission shaft 51. As a result, the upper rails 4 are moved relative to the lower rails 3 in the seat forward-rearward direction in the above-described manner. This adjusts the position of the seat with respect to the floor in the forward-rearward direction in the vehicle.

When manipulation of the manipulating portion 38a is ended to stop output of the manipulation signal to the control circuit 41, the control circuit 41 suspends actuation of the motor 31. This stops rotation of the screw shafts 7, thus restricting movement of the upper rails 4 relative to the lower rails 3 in the seat forward-rearward direction in the above-described manner. As a result, the seat is maintained at a certain position in the forward-rearward direction in the vehicle.

The illustrated embodiment has the advantages described below.

(1) In the illustrated embodiment, the two upper rails 4 are integrated with the reinforcement bracket 21 by fixing the front end portions of the upper rails 4 to the reinforcement bracket 21. This improves rigidity of the seat sliding apparatus 1 as a whole. Since the gear housing 32, which supports a relatively great load such as the gear mechanism for speed reduction (the worm gear), is fixed to the reinforcement bracket 21, the gear housing 32 is supported firmly. The manipulation switch 38 is fixed to the gear housing 32 and thus allowed to stably receive manipulation load from the user (the seated occupant). Additionally, the manipulation switch 38 is electrically connected to the motor 31 through the control circuit substrate 42 in the immediate proximity of the motor 31. This decreases the length of the wire harness that is necessary for electrically connecting the manipulation switch 38 to the motor 31. Correspondingly, the size of the space needed for arranging the wire harness and the mass of the wire harness are prevented from being increased. Also, since the manipulating portion 38a of the manipulation switch 38 is exposed at a forward end of the seat, the user (the seated occupant) is allowed to reach and manipulate the manipulating portion 38a from in front of the seat. As a result, the sensation of manipulating the manipulating portion 38a is similar to that of a manual seat sliding apparatus for vehicles, which adjusts the position of a seat in the seat forward-rearward direction through manual operation of a manipulation handle. Manipulation of the manipulating portion 38a is thus facilitated.

(2) In the illustrated embodiment, since the circuit case 35 is fixed to the gear housing 32, the motor 31 and the control circuit 41 are electrically connected to each other in the immediate proximity of the motor 31. This arrangement decreases the length of the wire harness necessary for electrically connecting the motor 31 to the control circuit 41.

Correspondingly, the size of the space needed for arranging the wire harness and the mass of the wire harness are prevented from being increased more effectively.

(3) In the illustrated embodiment, the manipulation switch 38 is fixed to the gear housing 32 through the circuit case 35. This allows the manipulation switch 38 to be connected directly to the control circuit 41 (the control circuit substrate 42) to electrically connect the motor 31 to the manipulation switch 38. As a result, the configuration for electrical connection between the manipulation switch 38 and the control circuit 41 is simplified and the number of the manufacturing steps is decreased.

(4) In the illustrated embodiment, the transmission mechanism 50 for transmitting rotation of the speed reducer-equipped motor 30 to the two screw shafts 7 is configured by the transmission shaft 51, the two first gears 55 and the corresponding second gears 56, and the casings 52. In this case, by reducing the speed of rotation of the motor 31 sufficiently through the gear mechanism (the worm gear), each first gear 55 and the corresponding second gear 56, which configure the screw gears, are allowed to perform transmission of rotation involving change of the orientation of the rotation axis of the transmission shaft 51 through a simple configuration, without changing the rotation speed of the transmission shaft 51. This further reduces the size of each casing 52 and thus the dimensions of the rail cross section of each upper rail 4. Further, since the load acting between the first and second gears 55, 56 is decreased, the first or second gears 55, 56 may be less rigid, thus allowing more flexible selection of the material for forming the first or second gears 55, 56. Also, the gear housing 32 for supporting the gear mechanism (the worm gear) and the two casings 52 for supporting the corresponding first and second gears 55, 56 are all fixed to and integrated with the reinforcement bracket 21. This further stabilizes transmission of rotation of the gear mechanism to the two first gears 55 and the corresponding second gears 56 through the transmission shaft 51.

(5) In the illustrated embodiment, the motor 31 is arranged such that the axis of the rotary shaft of the motor 31 extends substantially in the forward-rearward direction, which is different from the seat width direction in which the axis of the transmission shaft 51 extends. By arranging the motor 31 (the speed reducer-equipped motor 30) along the extending direction of each upper rail 4, the motor 31 (the speed reducer-equipped motor 30) is arranged in the space formed between the two upper rails 4.

(6) In the illustrated embodiment, the manipulation switch 38 is fixed to the gear housing 32, which is a conventional type for receiving the gear mechanism for speed reduction. This arrangement prevents the number of components from being increased.

The illustrated embodiment may be modified to the forms described below.

In the illustrated embodiment, a hook-like engagement claw may be projected upward from the gear housing 32 and a through hole with which the engagement claw is engaged may be formed in the reinforcement bracket 21. In this case, the gear housing 32 is fixed to the reinforcement bracket 21 by engaging the engagement claw with the peripheral portion of the through hole.

In the illustrated embodiment, each casing 52 may have a threaded hole, which extends downward from the upper end surface of the casing 52, and a bolt passing hole, which is an opening that faces both upward and downward, may be formed in the reinforcement bracket 21. In this case, the casing 52 is fixed to the reinforcement bracket 21 by passing a bolt through the bolt passing hole and then threading the threaded portion of the bolt onto the threaded hole to fasten the bolt.

In the illustrated embodiment, a connection terminal for feeding electric power to the motor 31 may be extended to a position in the vicinity of the control circuit substrate 42 and connected directly to the control circuit substrate 42.

In the illustrated embodiment, the control circuit 41, the control circuit substrate 42, and the rotary switch 43 may be omitted. The motor 31 is rotated directly through manipulation of the manipulation switch 38. In this case, the circuit case 35 (the outer case 36 and the inner case 37) may be omitted and a switch box forming a casing for the manipulation switch 38 may be fixed directly to the gear housing 32.

In the illustrated embodiment, the gear housing 32 does not necessarily have to be fixed to the reinforcement bracket 21 but may be fixed to the corresponding upper rail 4 (preferably, the front end portion of the upper rail 4) or another component connected to the upper rail 4. In this case, the reinforcement bracket 21 may be omitted. In other words, the gear housing 32 may be fixed to any suitable portion (preferably, a front end portion) of a rail structure including the upper rail 4.

In the illustrated embodiment, the reinforcement bracket 21 may be fixed to the front end portions of the two lower rails 3 and the speed reducer-equipped motor 30 (the gear housing 32) may be fixed to the reinforcement bracket 21. Also in this case, like the aforementioned case, the gear housing 32 does not necessarily have to be fixed to the reinforcement bracket 21 and may be fixed to any suitable portion (preferably, a front end portion) of a rail structure including the corresponding lower rail 3.

1 . . . Seat Sliding Apparatus for Vehicles, 3 . . . Lower Rail (First Rail), 4 . . . Upper Rail (Second Rail), 7 . . . Screw Shaft, 9 . . . Nut Member, 21 . . . Reinforcement Bracket, 30 . . . Speed Reducer-Equipped Motor, 31 . . . Motor, 32 . . . Gear Housing, 35 . . . Circuit Case, 38 . . . Manipulation switch, 38a . . . Manipulating Portion, 41 . . . Control Circuit, 42 . . . Control Circuit Substrate, 43 . . . Rotary Switch (Rotation Sensor), 50 . . . Transmission Mechanism, 51 . . . Transmission Shaft, 52 . . . Casing, 55 . . . First Gear, 56 . . . Second Gear

The invention claimed is:

1. A seat sliding apparatus for a vehicle, comprising:
a first pair of rails fixed to either one of a floor of a vehicle and a seat in the vehicle;
a rail structure including a second pair of rails fixed to the other one of the floor and the seat, the second rails being connected to the first rails in a manner movable relative to the first rails in a seat forward-rearward direction;
a pair of nut members, wherein each of the nut members is fixed to one of the first rails, respectively;
a pair of screw shafts, wherein each screw shaft is rotationally supported by the one of the second rails and threaded to one of the nut members, respectively, the screw shafts rotating relative to the corresponding nut members to move the second rails relative to the first rails in the seat forward-rearward direction;
a speed reducer-equipped motor connected to the two screw shafts through a transmission mechanism to rotate the screw shafts, the speed reducer-equipped motor including a motor, a gear mechanism, which is connected to a rotary shaft of the motor to reduce the speed of rotation of the motor, and a gear housing that rotationally supports the gear mechanism and is fixed to the rail structure such that the axis of an output shaft of the gear mechanism extends in a seat width direction; and a manipulation switch electrically connected to the equipped motor for actuating the speed reducer-equipped motor, the manipulation switch having a manipulating portion fixed to the gear housing and exposed at a forward end of the seat;

a rotation sensor for detecting rotation of the motor;

a control circuit that controls rotation of the motor based on the detected rotation;

a circuit case for accommodating the rotation sensor and the control circuit;

wherein the circuit case is fixed to the gear housing; and wherein the manipulation switch is fixed to the gear housing through the circuit case and electrically connected to the motor through the control circuit.

2. The seat sliding apparatus according to claim 1, wherein the rail structure includes a reinforcement bracket that is fixed to front end portions of the two second rails to connect the second rails together in the seat width direction, the gear housing being fixed to the reinforcement bracket.

3. The seat sliding apparatus according to claim 2, wherein the transmission mechanism includes:

a transmission shaft that extends along the axis of the output shaft of the gear mechanism and is passed through the gear housing, wherein the transmission shaft is connected to an output gear of the gear mechanism and is rotatable integrally with the output gear;

a first pair of gears connected to opposite end portions of the transmission shaft in a manner rotatable integrally with the transmission shaft;

second gears connected to front end portions of the corresponding screw shafts and rotatable integrally with the screw shafts, each of the second gears being meshed with the corresponding one of the first gears to change the orientation of the rotation axis of rotation of the first gear and to transmit the rotation of the first gear to the corresponding screw shaft; and a pair of casings fixed to opposite end portions of the rail structure in the seat width direction, each of the casings rotationally supporting the corresponding one of the first gears and the associated one of the second gears.

4. The seat sliding apparatus according to claim 3, wherein the motor is arranged such that the axis of the rotary shaft of the motor extends substantially in the forward-rearward direction, which is different from the seat width direction in which the axis of the transmission shaft extends.

\* \* \* \* \*